(12) United States Patent
Miyoshi

(10) Patent No.: US 6,980,612 B1
(45) Date of Patent: Dec. 27, 2005

(54) COMMUNICATION TERMINAL APPARATUS AND RADIO COMMUNICATION METHOD

(75) Inventor: Kenichi Miyoshi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 820 days.

(21) Appl. No.: 09/890,356

(22) PCT Filed: Nov. 20, 2000

(86) PCT No.: PCT/JP00/08151

§ 371 (c)(1),
(2), (4) Date: Jul. 30, 2001

(87) PCT Pub. No.: WO01/43311

PCT Pub. Date: Jun. 14, 2001

(30) Foreign Application Priority Data

Dec. 6, 1999 (JP) .................................. 11-346468

(51) Int. Cl.[7] .......................... H03D 1/04; H04B 1/02
(52) U.S. Cl. ...................... 375/346; 375/344; 375/345; 455/101; 455/103
(58) Field of Search .................. 375/144, 267, 375/299, 347, 371, 340, 346, 142, 143; 455/101, 455/103, 132

(56) References Cited

U.S. PATENT DOCUMENTS

| | | | | |
|---|---|---|---|---|
| 5,203,025 A | * | 4/1993 | Anvari et al. ................ | 455/134 |
| 5,504,783 A | * | 4/1996 | Tomisato et al. ........... | 375/267 |
| 5,799,010 A | * | 8/1998 | Lomp et al. ................. | 370/335 |
| 6,069,912 A | * | 5/2000 | Sawahashi et al. ......... | 375/142 |
| 6,151,328 A | * | 11/2000 | Kwon et al. ................. | 370/441 |
| 6,185,258 B1 | * | 2/2001 | Alamouti et al. ........... | 375/260 |
| 6,252,864 B1 | * | 6/2001 | Hayashi ...................... | 370/335 |
| 6,804,311 B1 | * | 10/2004 | Dabak et al. ................ | 375/347 |

FOREIGN PATENT DOCUMENTS

| | | |
|---|---|---|
| JP | 58077348 | 5/1983 |
| JP | 58087928 | 5/1983 |
| JP | 61069224 | 4/1986 |
| JP | 03201629 | 9/1991 |
| JP | 04150113 | 5/1992 |
| JP | 05300059 | 11/1993 |
| JP | 10190537 | 7/1998 |

OTHER PUBLICATIONS

Ari Hottinen et al, Transmit Diversity by Antenna Selection in CDMA Downlink, IEEE, 1998.*
Andoh H et al "Channel Estimation Using time Multiplexed Pilot Symbols For Coherent RAKE Combining for DS-CDMA Mobile Radio", IEEE, Sep. 19997, R & D, NTT Mobile Communication Network, Kanagawa, Japan.*
Korean Office Action with English translation dated May 22, 2003.
International Search Report dated Feb. 20, 2001.
"3GPP RAN 25.214 VI.1.0 (Jun. 1996)".

* cited by examiner

Primary Examiner—Jay K. Patel
Assistant Examiner—Qutbuddin Ghulamali
(74) Attorney, Agent, or Firm—Stevens, Davis, Miller & Mosher, LLP

(57) ABSTRACT

In closed-loop transmission diversity, a communication terminal apparatus calculates a phase correcting value for compensating for an effect of phase rotation due to the transmission diversity, using known feedback information, and corrects a received signal on a communication channel based on the phase correcting value, or corrects a channel estimation value based on the phase correcting value.

7 Claims, 9 Drawing Sheets

TRANSMISSION SIGNALS IN BASE STATION
IN COMMON PILOT CHANNEL SIGNAL

RECEIVED SIGNALS IN MOBILE STATION
IN COMMON PILOT CHANNEL SIGNAL

TRANSMISSION SIGNALS IN BASE STATION
IN COMMUNICATION CHANNEL SIGNAL

RECEIVED SIGNALS IN MOBILE STATION
IN COMMUNICATION CHANNEL SIGNAL

TRANSMISSION SIGNALS IN BASE STATION
IN COMMUNICATION CHANNEL SIGNAL

RECEIVED SIGNALS IN MOBILE STATION
IN COMMUNICATION CHANNEL SIGNAL

RECEIVED SIGNALS IN MOBILE STATION
IN COMMON PILOT CHANNEL SIGNAL

COMMUNICATION TERMINAL APPARATUS AND RADIO COMMUNICATION METHOD

TECHNICAL FIELD

The present invention relates to a communication terminal apparatus and radio communication method in a digital radio communication system, and more particularly to a communication terminal apparatus and radio communication method in a DS-CDMA (Direct Sequence-Code Division Multiple Access) system.

BACKGROUND ART

In a mobile communication the received signal quality deteriorates extremely due to fading. There exists a diversity technique as an effective method for the fading. The diversity technique is to prevent received signal power from falling on a receiver side. However, there are various restrictions to achieve the diversity in a communication terminal apparatus such as a mobile station. Therefore, in order to achieve on a transmitter side of a base station the diversity that is originally expected to be achieved on a receiver side of the mobile station, transmission diversity has been examined.

In the transmission diversity, as illustrated in FIG. 1, base station 1 transmits signals of the same phase from antennas 1 and 2 to mobile station 2, and mobile station 2 selects a received signal with a higher level transmitted from one of the antennas.

Meanwhile, in the DS-CDMA system, the standardization of the transmission diversity is promoted currently that a base station uses closed-loop transmission diversity. There are three modes in the closed-loop transmission diversity. For example, when mode 2 of the closed-loop transmission diversity is applied, a base station provides a signal of antenna 2 with phase rotation (90° shift) with respect to a signal of antenna 1 to transmit. Using signals transmitted from antennas 1 and 2, the mobile station judges a phase difference to be provided between the both signals, and transmits the phase difference information to the base station. The base station transmits signals according to the phase difference information. This processing is executed for each slot. Therefore, the mobile station receives signals with a phase rotated greatly for each slot.

With reference to FIGS. 2 to 8, phases of received signals will be described below that are received at a mobile station when a base station applies mode 2 of the closed-loop transmission diversity.

The base station transmits common pilot channel signals (common known signals) of the same phase from antennas 1 and 2. At this point, the common pilot channel signal transmitted from antenna 1 is spread with a different spreading code from a spreading code that is used in the common pilot channel signal transmitted from antenna 2.

In transmitting communication channel signals from the base station, since the phase rotation control is not performed at a general condition that is not of the closed-loop transmission diversity, the base station transmits the signals to the mobile station using only antenna 1. In the closed-loop transmission diversity, as illustrated in FIG. 6, a signal to be transmitted from antenna 2 is provided with a phase designated by feedback information transmitted from the mobile station, and thereby the phase rotation control is performed to transmit signals.

When the mobile station receives the signals thus transmitted from the base station, since with respect to common pilot channel signals, different signals are transmitted from antennas 1 and 2, channel estimation is capable of being performed for each transmission antenna. In other words, as illustrated in FIG. 3, the mobile station receives signals with different phase rotations respectively from antennas 1 and 2, and therefore channels are estimated separately on the common pilot channel signal transmitted from antenna 1 and the common pilot channel signal transmitted from antenna 2.

Based on the two channel estimation values, the mobile station determines a phase difference to be provided between signals to be respectively transmitted from antennas 1 and 2, and then notifies the base station of the phase difference (feedback information). The setting of the feedback information is herein explained.

As described above, the base station transmits the common pilot channel signals respectively using antennas 1 and 2. The mobile station performs the channel estimation on the common pilot channel signals, and thereby is capable of calculating a phase rotation amount and amplitude variation due to fading on each of antennas 1 and 2.

As illustrated in FIG. 2, when the base station transmits common pilot channel signals with the same amplitude and same phase (phase=0) respectively from antennas 1 and 2, the mobile station receives signals as illustrated in FIG. 3. In FIG. 3, α is indicative of the phase rotation due to fading provided on the transmission signal from antenna 1, while β is indicative of the phase rotation due to fading provided on the transmission signal from antenna 2.

As illustrated in FIG. 4, when the base station transmits communication channel signals with the same amplitude and same phase (phase=0) respectively from antennas 1 and 2, the mobile station receives signals as illustrated in FIG. 5. In FIG. 5, A is indicative of an amplitude variation due to fading provided on the transmission signal from antenna 1, while B is indicative of an amplitude variation due to fading provided on the transmission signal from antenna 2. In the mobile station, signals transmitted from antennas 1 and 2 are combined and received as a signal indicated by a bold arrow as illustrated in FIG. 5. At this point, the phase of the combined vector is Φ before.

In this case, since β−α is about 90°, it is expected that rotating the phase of a signal from antenna 2 by 90° increases the combined vector composed of the signals transmitted antennas 1 and 2. Therefore, the phase of a signal from antenna 2 is set to −90°, and the mobile station notifies the base station of feedback information (phase difference) for requesting the base station to transmit the signal with the phase difference.

When the feedback information is notified to the base station correctly, a communication channel signal is transmitted on a next slot as illustrated in FIG. 6. In other words, the signal with a phase shifted −90° is transmitted from antenna 2. As a result, the mobile station receives signals as illustrated in FIG. 7. At this point, the phase of the combined vector is rafter. Accordingly, even when the fading environment does not change, in the mobile station a phase shift is caused like Φ rafter and Φ before due to the phase addition in antennas on a transmitting side.

On the communication channel of the mobile station, by increasing channel estimation accuracy, control is performed that channel estimated results of a plurality of slots are weighted to be added. This control is performed on the assumption that a phase rotation amount due to a fading variation is small with respect to the number of slots whose channel estimated results are added. However, as described above, when the closed-loop transmission diversity is applied, since the channel estimation value varies even when the fading does not varies, it is not possible to calculate an accurate channel estimation value by averaging channel estimation values of a plurality of slots to use, and thereby reception performance deteriorates.

DISCLOSURE OF INVENTION

It is an object of the present invention to provide a communication terminal apparatus and radio communication method enabling excellent reception performance without deterioration of channel estimation accuracy even in transmission diversity using closed-loop transmission diversity.

The inventors of the present invention paid attention to that in the closed-loop transmission diversity, when a phase rotates due to the transmission diversity control, a communication terminal notifies feedback information (phase rotation amount) to a base station on a last slot, and that the communication terminal knows a phase difference to be provided between corresponding slots to be transmitted respectively from antennas 1 and 2, found out that the communication terminal is capable of performing accurate channel estimation even in the closed-loop transmission diversity by correcting a received signal using the known phase difference, and carried out the present invention.

That is, it is a gist of the present invention that in the closed-loop transmission diversity, a communication terminal apparatus calculates a phase correcting value for compensating for an effect of the phase rotation due to the transmission diversity, using the feedback information known in the communication terminal apparatus, corrects a received signal on a communication channel based on the phase correcting value, or corrects a channel estimation value based on the phase correcting value, and thereby exhibits excellent reception performance.

BEST MODE FOR CARRYING OUT THE INVENTION

Embodiments of the present invention will be described specifically below with reference to accompanying drawings.

First Embodiment

Figure 9:
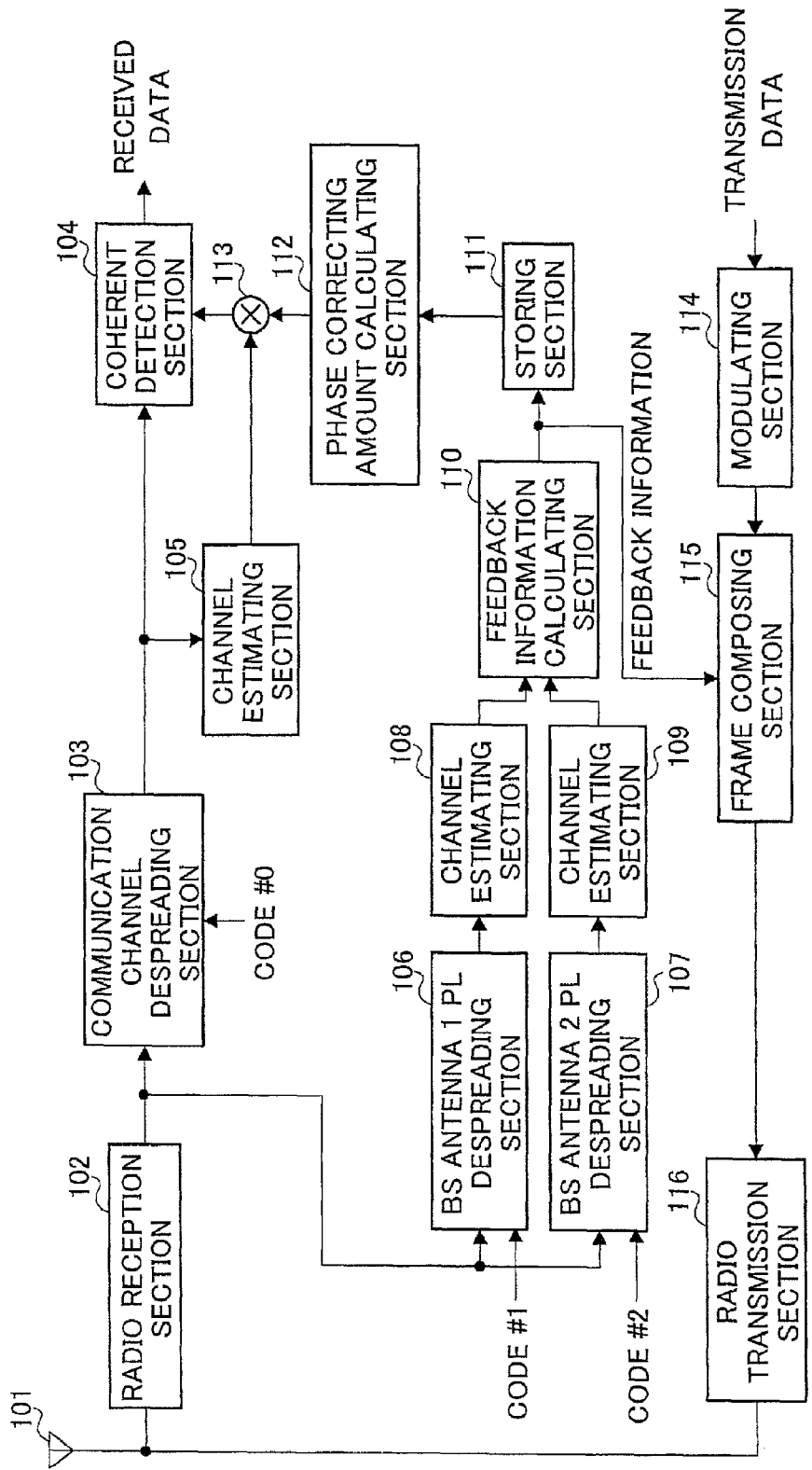
FIG. 9 is a block diagram illustrating a configuration of a communication terminal apparatus according to a first embodiment of the present invention.

FIG. 9 is a block diagram illustrating a configuration of a communication terminal apparatus according to the first embodiment of the present invention. A signal received at antenna 101 is output to radio reception section 102. Radio reception section 102 performs predetermined radio reception processing (such as downconverting and A/D conversion) on the received signal.

A communication channel signal is subjected to the radio reception processing, and is output to communication channel despreading section 103 to be despread with a spreading code #0 used in spreading in a base station apparatus. The signal subjected to despreading (despread signal) is output to coherent detection section 104 and channel estimating section 105.

Channel estimating section 105 performs channel estimation using the despread signal to obtain a channel estimation value. The channel estimation value is subjected to phase correction using a phase correcting value obtained as described later, and the phase-corrected channel estimation value is output to coherent detection section 104. Coherent detection section 105 performs coherent detection on the despread signal according to the phase-corrected channel estimation value, and obtains received data.

Meanwhile, a common pilot channel signal is subjected to the radio reception processing in radio reception section 102, and is output to BS antenna 1PL despreading section 106 and BS antenna 2PL despreading section 107. Each of BS antenna 1PL despreading section 106 and BS antenna 2PL despreading section 107 despreads the radio-reception processed signal using a respective spreading code used in spreading in the base station apparatus to obtain a desired despread signals. Specifically, BS antenna 1PL despreading section 106 performs the despreading using a spreading code #1, and acquires a signal transmitted from antenna 1 of the base station apparatus, while BS antenna 2PL despreading section 107 performs the despreading using a spreading code #2, and acquires a signal transmitted from antenna 2 of the base station apparatus.

The despread signal in BS antenna 1PL despreading section 106 is output to channel estimating section 108. Channel estimating section 108 performs channel estimation on the signal transmitted from antenna 1 of the base station apparatus. The despread signal in BS antenna 2PL despreading section 107 is output to channel estimating section 109. Channel estimating section 109 performs channel estimation on the signal transmitted from antenna 2 of the base station apparatus.

The channel estimation values obtained in channel estimating sections 108 and 109 are output to feedback information calculating section 110. Feedback information calculating section 110 calculates feedback information based on the respective channel estimation values on the signals transmitted from antennas 1 and 2 of the base station apparatus. The feedback information is output to frame composing section 115 on a transmitter side to be notified to the base station apparatus, while being output to storing section 111 to be stored.

Phase correcting amount calculating section 112 acquires the feedback information stored in storing section 111, and calculates a phase correcting amount with respect to a phase provided on a base station apparatus side in the closed-loop transmission diversity. The phase correcting amount is multiplied in multiplier 113 by the channel estimation value obtained from the communication channel signal previously mentioned. A channel estimation value is thereby obtained with the phase rotation canceled that is provided on the base station apparatus side in the closed-loop transmission diversity. The channel estimation value with the phase rotation canceled is output to coherent detection section 104.

On the transmitter side, transmission data is output to modulating section 114 to be digital-modulated therein. The modulated transmission data is output to frame composing section 115. Frame composing section 115 performs frame composition using the modulated transmission data and the feedback information obtained from the channel estimation value on the common pilot channel signal. The frame-composed transmission data and feedback information is output to radio transmission section 116 to be subjected to predetermined radio transmission processing (such as D/A conversion and upconverting), and is transmitted to the base station apparatus through the antenna.

The operation of the communication terminal apparatus according to this embodiment will be described below. In addition, a case is explained that the closed-loop transmission diversity is of mode 2.

Figure 1:
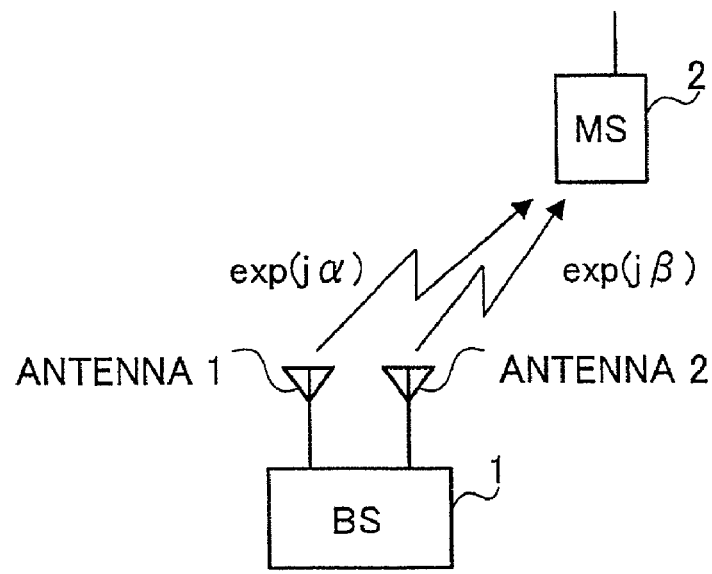
FIG. 1 is a diagram to explain transmission diversity.
Figure 2:
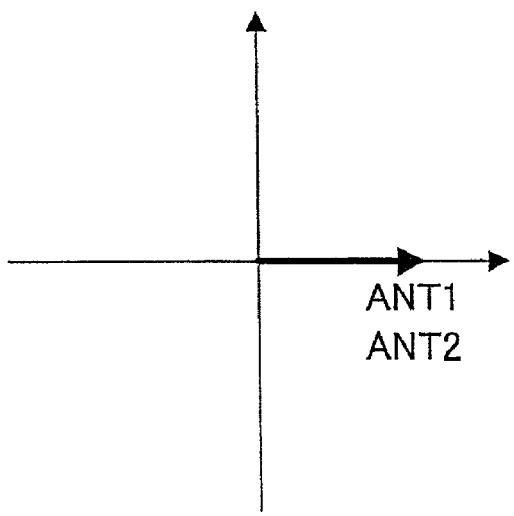
FIG. 2 is a diagram illustrating phases of transmission signals in a base station in common pilot channel signal before phase rotation control is performed.
Figure 3:
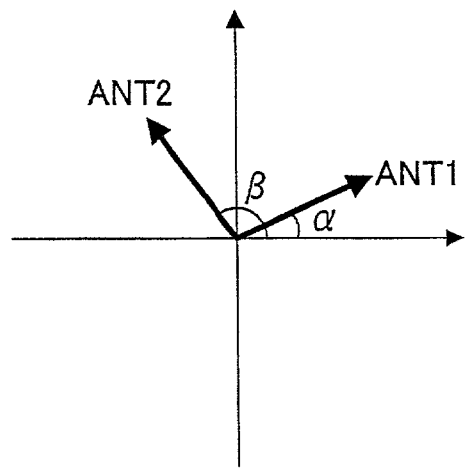
FIG. 3 is a diagram illustrating phases of received signals in a mobile station in the common pilot channel signal before the phase rotation control is performed.

As illustrated in FIG. 2, when common pilot channel signals with the same amplitude and same phase (phase=0) are transmitted respectively from antennas 1 and 2 of the base station, the mobile station receives signals as illustrated in FIG. 3. The thus received signal is despread in BS antenna 1PL despreading section 106 with the spreading code #1, and the despread signal is output to channel estimating section 108. Channel estimating section 108 performs the channel estimation on the common pilot channel signal transmitted from antenna 1 of the base station apparatus. The received signal is also despread in BS antenna 2PL despreading section 107 with the spreading code #2, and the despread signal is output to channel estimating section 109. Channel estimating section 109 performs the channel estimation on the common pilot channel signal transmitted from antenna 2 of the base station apparatus.

Respective channel estimation values obtained in channel estimating sections 108 and 109 are output to feedback information calculating section 110. Feedback information calculating section 110 calculates the feedback information using two channel estimation values as described below.

Figure 4:
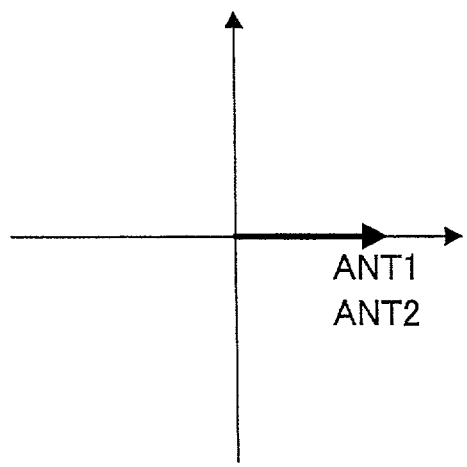
FIG. 4 is a diagram illustrating phases of transmission signals in the base station in communication channel signal before the phase rotation control is performed.
Figure 5:
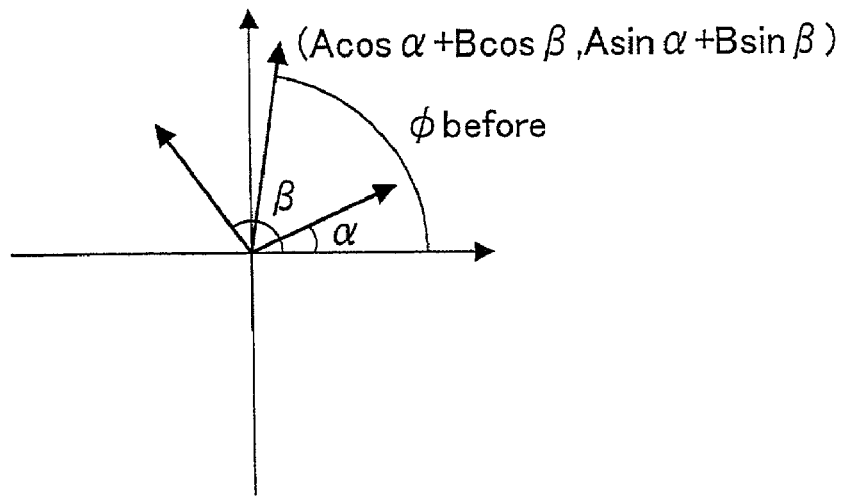
FIG. 5 is a diagram illustrating phases of received signals in the mobile station in the communication channel signal before the phase rotation control is performed.
Figure 6:
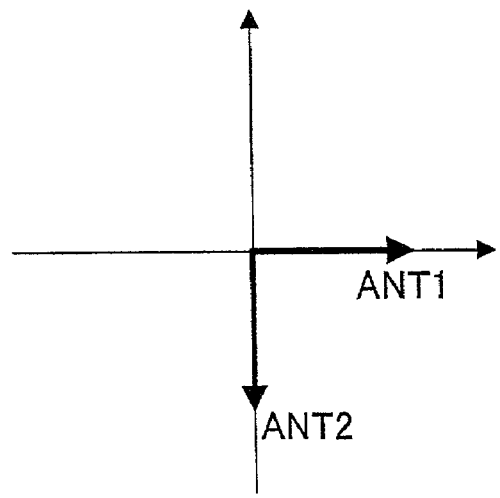
FIG. 6 is a diagram illustrating phases of transmission signals in the base station in the communication channel signal after the phase rotation control is performed.

The communication channel signal with the amplitude and phase (phase=0) illustrated in FIG. 4 transmitted from the base station apparatus is received as illustrated in FIG. 5. Communication channel signals transmitted from antennas 1 and 2 are combined and received as a signal indicated by a bold arrow as illustrated in FIG. 5. At this point, the phase of the combined vector is Φ before. Φ before is stored in storing section 111. In FIG. 5, A is indicative of the amplitude variation due to fading provided on the transmission signal from antenna 1, while B is indicative of the amplitude variation due to fading provided on the transmission signal from antenna 2.

As can be seen from FIG. 3, since a phase rotation difference β−α due to fading is about 90° between signals transmitted from antennas 1 and 2, it is expected that rotating the phase of the signal from antenna 2 by −90° increases the combined vector composed of the signals transmitted antennas 1 and 2.

In the mode 2 of the closed-loop transmission diversity, since there are 4 kinds of phase differences, i.e., 0°, +90°, 180° and −90°, which are provided intentionally on a base station apparatus side, the phase of a signal from antenna 2 is set to −90°. The feedback information is thus calculated.

The communication terminal apparatus notifies the base station apparatus of the feedback information (phase difference) calculated in feedback information calculating section 110. Specifically, since the phase differences of the feedback information are of 4 kinds and each is indicated by 2 bits, the feedback information composed of 2 bits is output to frame composing section 115, and frame composing section 115 composes a frame with the information and transmission data. The feedback information in the frame-composed transmission signal is notified to the base station apparatus.

When the base station apparatus receives the received signal and acquires the feedback information, the apparatus transmits on a next slot a communication channel signal provided with a phase difference corresponding to the feedback information to the communication terminal apparatus. That is, as illustrated in FIG. 5, the signal with a phase of −90° is transmitted from antenna 2.

Figure 7:
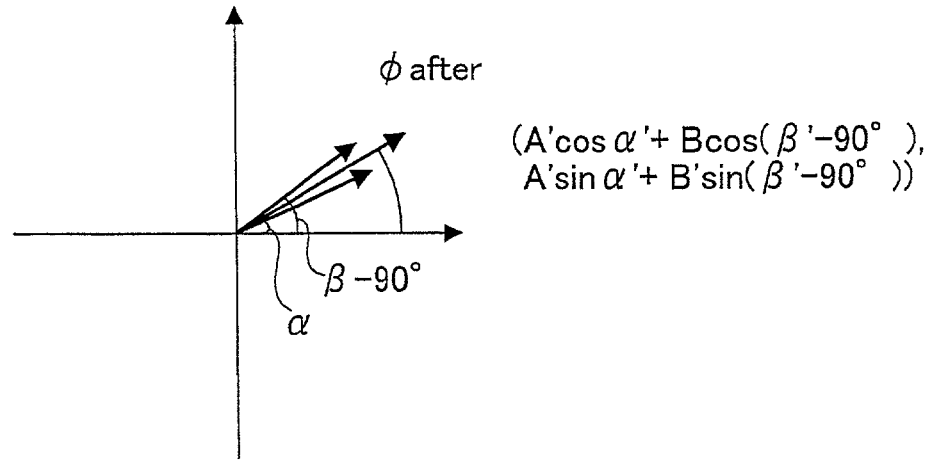
FIG. 7 is a diagram illustrating phases of received signals in the mobile station in the communication channel signal after the phase rotation control is performed.
Figure 8:
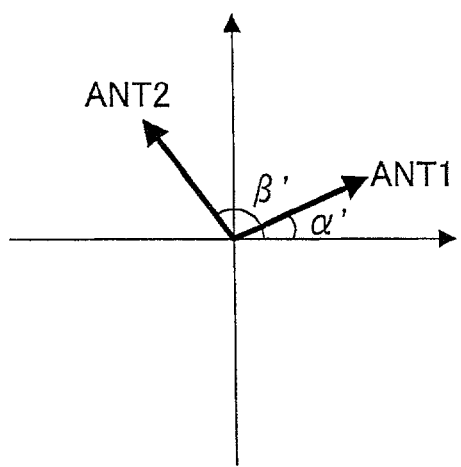
FIG. 8 is a diagram illustrating phases of received signals in the mobile station in the common pilot channel signal after the phase rotation control is performed.

The communication terminal apparatus receives signals as illustrated in FIG. 7. At this point, the phase of the combined vector is Φ after. Φ after is obtained in phase correcting amount calculating section 112 as described below. FIG. 8 illustrates phases of received common pilot channel signals transmitted from the base station apparatus with the phase rotation provided according to the feedback information. In FIG. 8, α' is indicative of the phase rotation due to fading provided on the transmission signal from antenna 1, β' is indicative of the phase rotation due to fading provided on the transmission signal from antenna 2, A' is indicative of the amplitude variation due to fading provided on the transmission signal from antenna 1, and B' is indicative of the amplitude variation due to fading provided on the transmission signal from antenna 2.

Accordingly, Φ after is calculated using these values in the equation that Φ after=tan−1(A' cos α'+B' cos(β'−90°)/A' sin α'+B' sin(β−90°).

The phase rotation amount by the phase addition in the closed-loop transmission diversity is obtained from a difference between Φ before and Φ after. Accordingly, phase correcting amount calculating section 112 first obtains Φ after, then obtains the difference between Φ before and after using Φ before stored in storing section 111, and thereby obtains the phase correcting amount.

Channel estimating section 105 of the communication terminal apparatus performs channel estimation on a communication channel signal with a phase rotation provided by the closed-loop transmission diversity transmitted from a base station apparatus. The channel estimation value obtained in channel estimating section 105 is multiplied by the phase correcting amount described previously in multiplier 113. The channel estimation value is thereby obtained that is corrected in the phase rotation provided by the closed-loop transmission diversity. The corrected channel estimation value is output to coherent detection section 104. Coherent detection section 104 performs coherent detection on the communication channel signal using the corrected channel estimation value.

Figure 13:
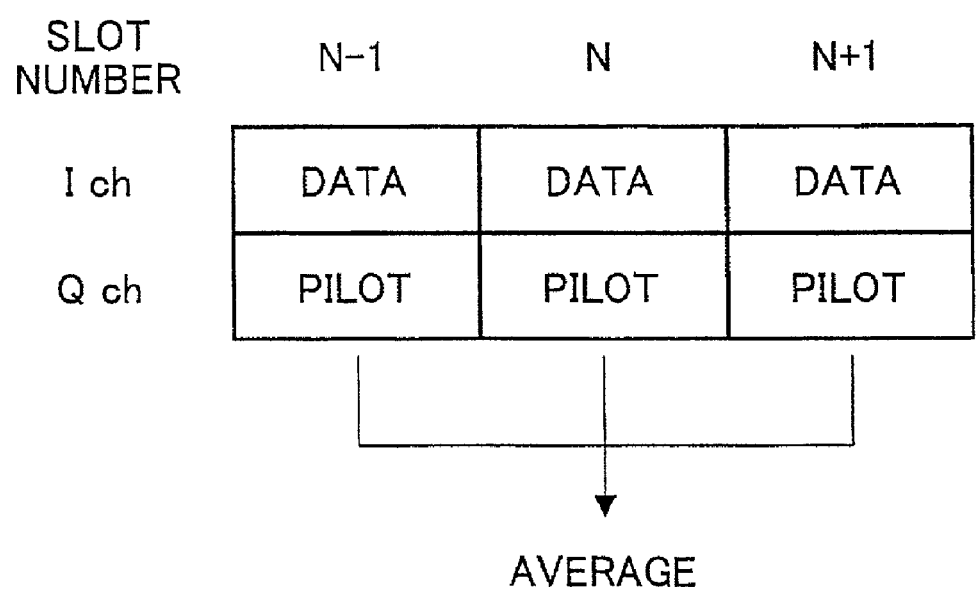
FIG. 13 is a diagram to explain coherent detection in the communication terminal apparatus according to this embodiment.

It may be possible to provide channel estimating section 105 with a processing section for averaging channel estimation values over a plurality of slots. For example, as illustrated in FIG. 13, phase-corrected channel estimation values corresponding to three slots (N−1, N and N+1) of quadrature component (Q channel) are weighted to be averaged, a channel estimation value $\xi$ N on the slot N is thereby obtained, and data of in-phase component (I channel) is subjected to coherent detection using $\xi$N. It is thereby possible to improve the channel estimating accuracy on a communication channel, and to perform more accurate channel estimation even when the closed-loop transmission diversity is applied.

In this coherent detection, since the channel estimation value is used in which only fading variation is reflected, the channel estimation is capable of being performed by averaging channel estimation values on a plurality of slots to perform the channel estimation. As a result, excellent reception performance is obtained even in the closed-loop transmission diversity.

Thus, the communication terminal apparatus according to this embodiment, in the closed-loop transmission diversity, calculates a correcting value for compensating for an effect of the phase ration in the closed-loop transmission diversity using feedback information that is known on a side of the communication terminal apparatus, corrects a received signal on a communication channel based on the correcting value, and thereby is capable of performing accurate channel estimation and exhibiting excellent reception performance.

In addition, in this embodiment, the channel estimation value of a communication channel signal is multiplied by the phase correcting value so as to compensate for an effect of the phase rotation in the closed-loop transmission diversity. However, it may be also possible in this embodiment to multiply a communication channel signal by the phase correcting value so as to compensate for an effect of the phase rotation in the closed-loop transmission diversity, and then to perform channel estimation on the compensated communication channel signal. In addition, in order to decrease the number of multiplying calculations (to one time), it is preferable to multiply the channel estimation value by the phase correcting value.

Second Embodiment

It is considered in the first embodiment that when incorrect feedback information arrives at a base station apparatus, a communication terminal apparatus may perform correction that is not necessary. Therefore, in this embodiment, a case will be described that coherent detection is performed on both communication channel signals which are subjected and not subjected to correction, and that one with a higher communication quality is used as a coherent detection result. In addition, a case is explained that as a criterion for evaluating the communication quality, SIR (Signal to Interference Ratio) is used.

Figure 10:
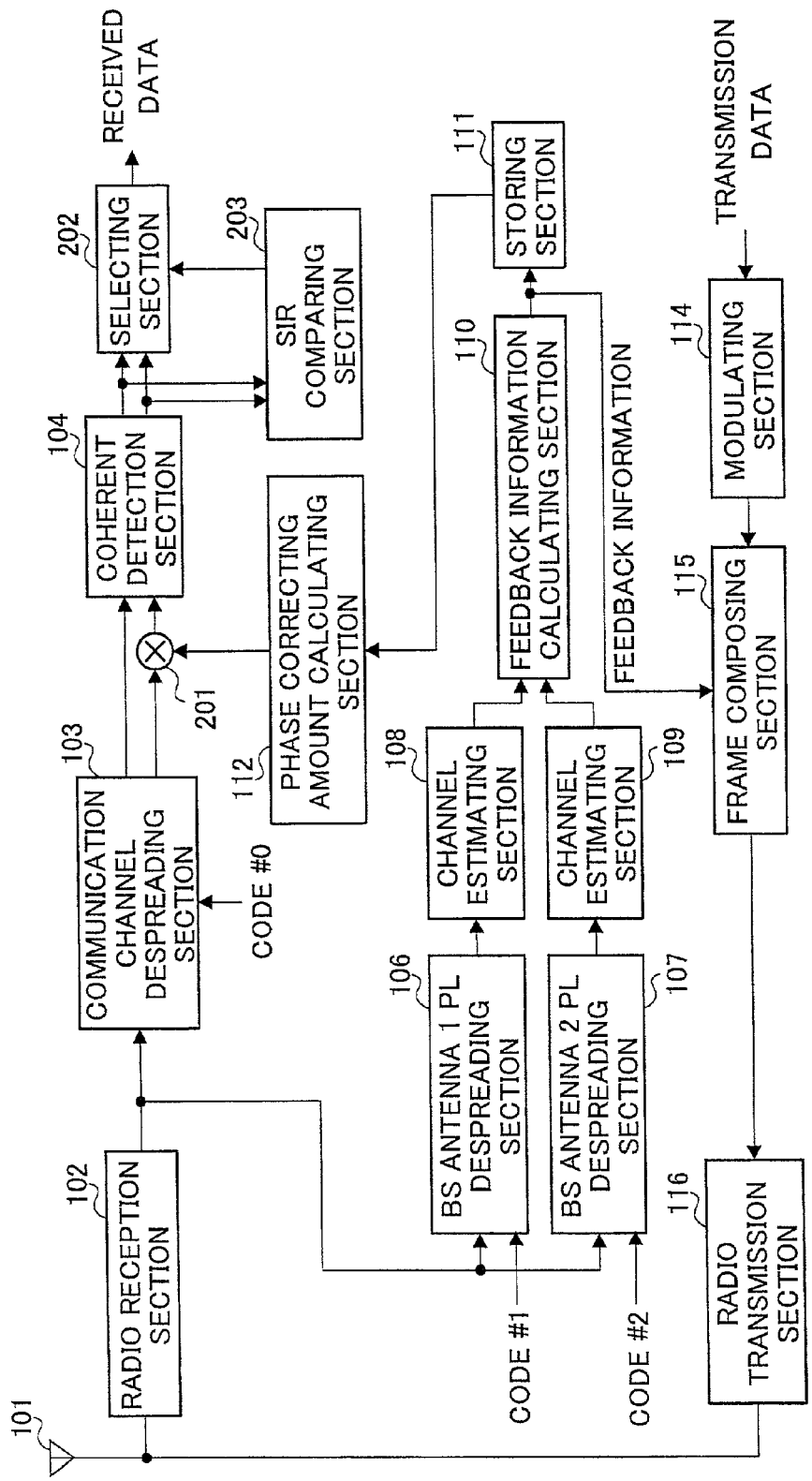
FIG. 10 is a block diagram illustrating a configuration of a communication terminal apparatus according to a second embodiment of the present invention.

FIG. 10 is a block diagram illustrating a configuration of a communication terminal apparatus according to the second embodiment of the present invention. In FIG. 10, the same sections as in FIG. 9 are assigned the same reference numerals as in FIG. 9, and detailed explanation thereof are omitted.

The communication terminal apparatus illustrated in FIG. 10 has multiplier 201 that multiplies a despread signal from communication channel despreading section 103 by a phase correcting value calculated in phase correcting amount calculating section 112, SIR comparing section 203 which measures SIR on a coherent detection result of a despread signal subjected to phase correction and SIR on another coherent detection result obtained by performing coherent detection on the despread signal without performing the phase correction and which compares both measured results with each other, and selecting section 202 that selects one of the coherent detection results based on the compared result of SIR.

In the communication terminal apparatus with such a configuration, coherent detection section 104 performs coherent detection on a despread signal from communication channel despreading section 103, and outputs the coherent detection result to SIR comparing section 203. Meanwhile, multiplier 201 multiplies the despread signal from communication channel despreading section 103 by the phase correcting value calculated in phase correcting amount calculating section 112. In addition, the phase correcting value is calculated in the same as in the first embodiment. The phase-corrected despread signal (communication channel signal) is output to coherent detection section 104. Coherent detection section 104 performs the coherent detection on the phase-corrected despread signal, and outputs the coherent detection result to SIR comparing section 203.

SIR comparing section 203 measures SIR on the two coherent detection results, and compares the measured results. The compared result is output to selecting section 202. Selecting section 202 receives as its inputs the two coherent detection results from coherent detection section 104, and based on the compared result from SIR comparing section 203, selects one coherent detection result with an excellent communication quality.

In this case, the coherent detection on the phase-corrected despread signal is selected when the phase correction should be performed, while the coherent detection result on the despread signal that is not subjected to the phase correction is selected when the phase correction should not be performed.

Figure 11:
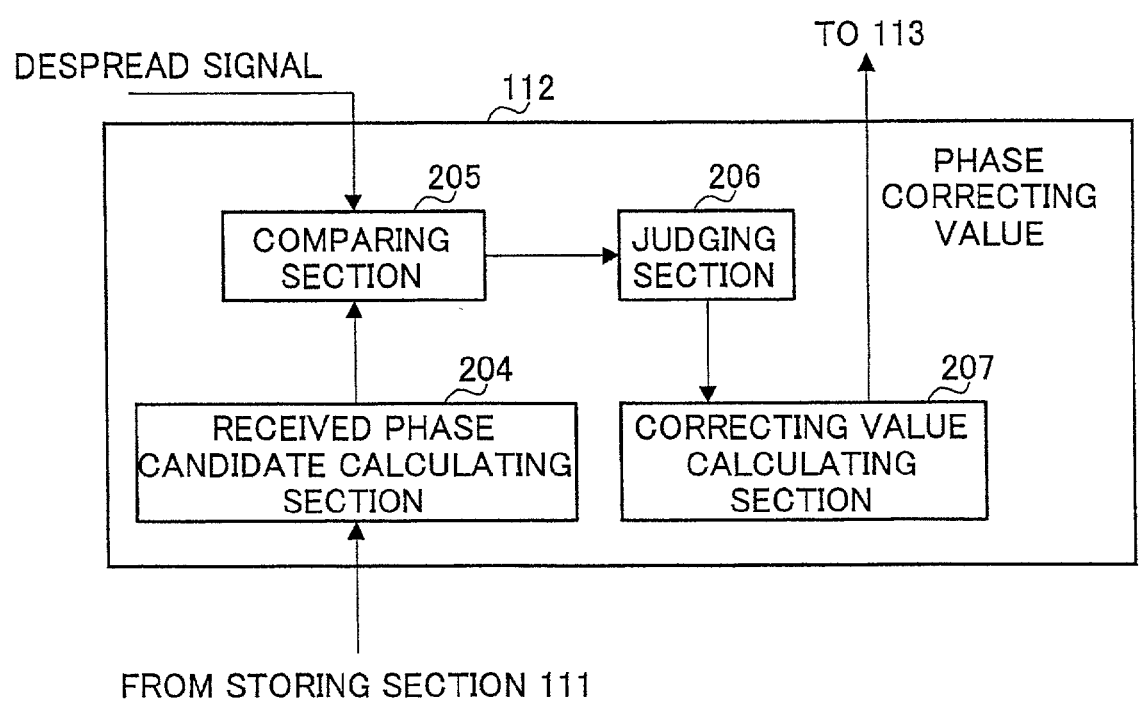
FIG. 11 is a block diagram illustrating a configuration of a phase correcting amount calculating section in the communication terminal apparatus according to the above second embodiment.

Further in this embodiment, it may be possible to configure phase correcting amount calculating section 112 as illustrated in FIG. 11. The following operation is performed in this configuration. Since a communication terminal apparatus stores the feedback information, the terminal apparatus knows a phase of a signal transmitted from a base station apparatus. Accordingly, the terminal apparatus calculates a candidate of a phase of a signal that is expected to receive when the signal of each phase (for example, 0°, +90°, −90° and 180°) is transmitted. Specifically, received phase candidate calculating section 204 acquires feedback information stored in storing section 111, and based on the feedback information, calculates received phase candidates.

The received phase candidates are output to comparing section 205. Comparing section 205 compares each of the received phase candidates with an actual phase of a received signal obtained from the despread signal, and outputs compared results to judging section 206. Judging section 206 selects a received phase candidate with the smallest angle difference between the compared results. Selecting the received phase candidate is equivalent to judging that a signal with the phase is transmitted from the base station apparatus. The judged result is output to correcting value calculating section 207. Based on the judged phase, correcting value calculating section 207 calculates a phase correcting amount.

Thus, by configuring phase correcting amount calculating section 112 in the way described above, even when a base station apparatus receives incorrect feedback information, it is possible to perform accurate channel estimation and to exhibit excellent reception performance.

In the above-mentioned embodiment, the case is explained that a communication terminal apparatus calculates a phase correcting value using the feedback information to be transmitted to a base station apparatus. However, the present invention is capable of being applied to a case that a communication terminal apparatus does not use the feedback information to be transmitted to a base station apparatus.

For example, since all n types of phase rotation amounts (for example, 0°, 90°, 180° and −90°) are predetermined that have a possibility of being provided by a base station apparatus in the closed-loop transmission diversity, a communication terminal apparatus is capable of calculating a phase predict value of a received communication channel signal transmitted with each phase rotation amount provided. Each phase predict value is compared with a phase of a channel estimation value obtained from a received communication channel signal, and each angle difference is obtained. These angle differences are used as likelihood. In other words, a phase rotation amount with the highest likelihood (smallest angle difference) is selected from among n types of them. The phase correcting value is calculated based on the selected phase rotation amount.

The need for communicating the feedback information with a base station apparatus is thereby eliminated, whereby it is possible to simplify the communication control and also to improve the transmission efficiency.

When a communication terminal apparatus thus compares a phase predict value with a phase of a channel estimation value to select a phase rotation amount, the terminal apparatus uses the feedback information to be transmitted to a base station apparatus. When the communication terminal apparatus transmits the feedback information to the base station apparatus, a case may occur that the base station apparatus receives erroneous feedback information. In this case, by using both the phase rotation amount obtained by using the phase predict value as described above and the feedback information, the communication terminal apparatus is capable of identifying the phase rotation amount provided by the base station apparatus with high accuracy.

When the feedback information is composed of a plurality of bits, a probability that erroneous information is transmitted is not the same on all the phase rotation amounts. For example, the probability that 2 bits are erroneous is lower than the probability that 1 bit is erroneous. Therefore the probability that a base station apparatus transmits signals according to the feedback information with two erroneous bits is lower than the probability that the base station apparatus transmits signals according to the feedback information with one erroneous bit.

For example, when the feedback information is transmitted with bits 00 indicative of 0°, bits 01 indicative of 90°, bits 01 indicative of 180°, and bits 11 indicative of −90° and the communication terminal apparatus transmits bits 00, the probability that the base station apparatus receives bits 11 incorrectly is lower than the probability that the base station apparatus receives bits 01 or 10 incorrectly. Accordingly, when the communication terminal apparatus transmits bits 00, it is more likely for the base station apparatus to receive the bits as 90° or 180° than as −90°. Then the likelihood calculated with 90° or 180° is more weighted than the likelihood calculated with −90°. It is thereby possible to improve the accuracy in judging the phase rotation with which the base station apparatus provides a signal in transmitting.

Thus, according to the present invention, coherent detection is performed on both communication channel signals which are subjected and not subjected to phase correction, and one with an excellent communication quality is used as a coherent detection result, whereby even when incorrect feedback information arrives at a base station apparatus, it is possible to perform accurate channel estimation and to exhibit excellent reception performance. The present invention thereby enables excellent reception performance with higher accuracy in the closed-loop transmission diversity.

Third Embodiment

As phase rotation amounts in the closed-loop transmission diversity, angles (0°, +90°, 180° and −90°) are predetermined. In this embodiment, a case is explained that a communication terminal apparatus calculates correcting values always corresponding to all the phase rotation amounts, performs the coherent detection while performing the phase correction, and adopts, as the coherent detection result, one with an excellent communication quality among the coherent detection results. In addition, a case is explained that as a criterion for evaluating the communication quality, SIR (Signal to Interference Ratio) is used.

Figure 12:
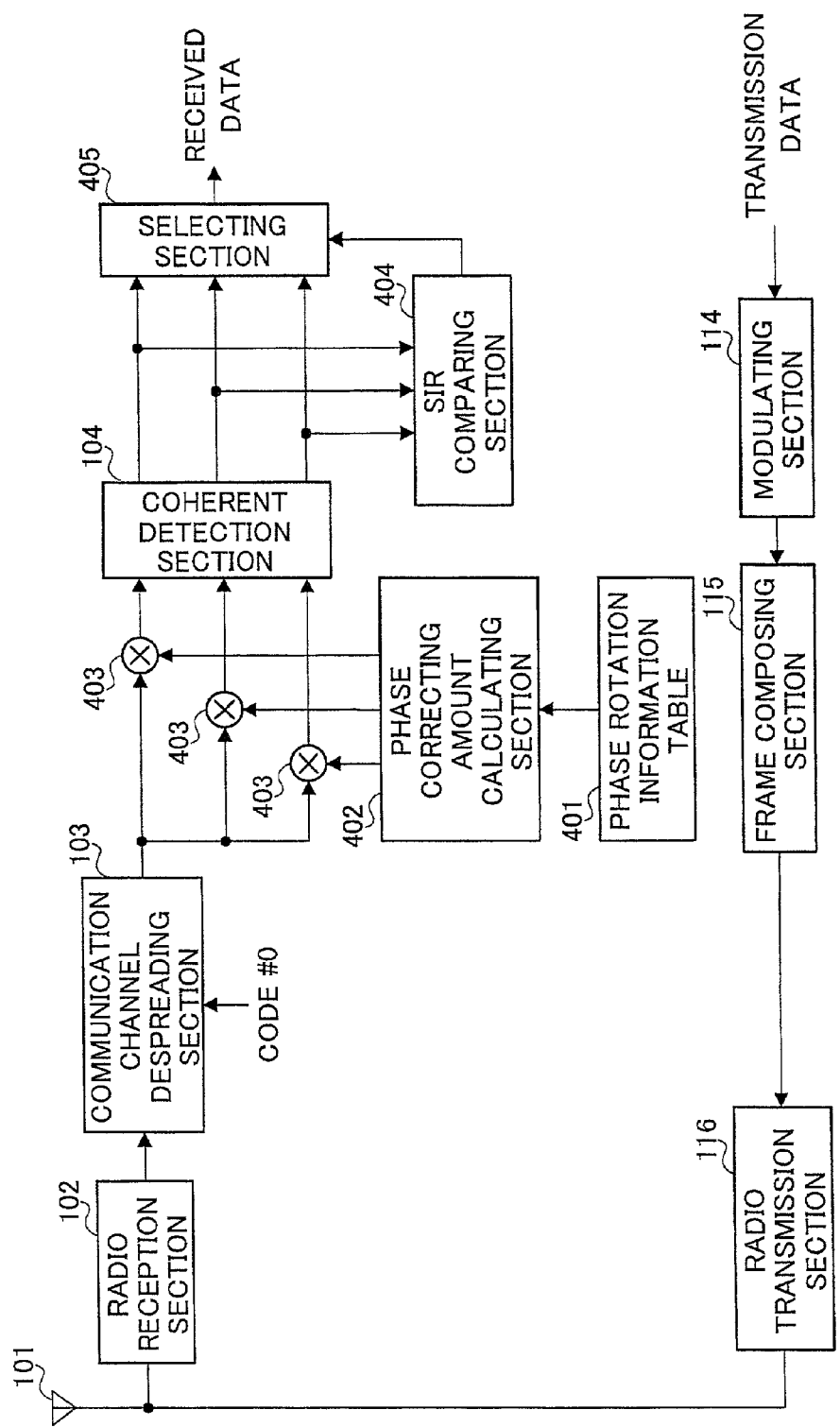
FIG. 12 is a block diagram illustrating a configuration of a communication terminal apparatus according to a third embodiment of the present invention.

FIG. 12 is a block diagram illustrating a configuration of a communication terminal apparatus according to the third embodiment of the present invention. In FIG. 12, the same sections as in FIG. 9 are assigned the same reference numerals as in FIG. 9, and detailed explanation thereof are omitted.

The communication terminal apparatus illustrated in FIG. 12 has a plurality of multipliers 403 each of which multiplies a despread signal from communication channel despreading section 103 by a phase correcting value calculated in phase correcting amount calculating section 402 using phase rotation information table 401, SIR comparing section 404 which measures SIR on each coherent detection result of the despread signal subjected to phase correction and which compares the measured results with each other, and selecting section 405 that selects one of the coherent detection results based on the compared result of SIR.

In the communication terminal apparatus with such a configuration, the phase rotation amounts which are predetermined in the closed-loop transmission diversity are stored in phase rotation information table 401. Phase correcting amount calculating section 402 refers to the phase rotation amounts in phase rotation amount information table 401 to calculate phase correcting values. In addition, the phase correcting values are calculated in the same way as in the first embodiment.

Each of multipliers 403 multiplies the despread signal from communication channel despreading section 103 by a respective phase correcting value calculated in phase correcting amount calculating section 402. At this point, multipliers 403 multiply the despread signal respectively by the phase correcting values corresponding to all the phase rotation amounts predetermined in the closed-loop transmission diversity. Then, the phase-corrected despread signals (communication channel signals) are output to coherent detection section 104. Coherent detection section 104 performs coherent detection on each phase-corrected despread signal, and outputs the coherent detection result to SIR comparing section 404.

SIR comparing section 404 measures respective SIR on all the coherent detection results, and compares the measured results. The compared result is output to selecting section 405. Selecting section 405 receives as its inputs all the coherent detection results from coherent detection section 104, and based on the compared result from SIR comparing section 404, selects one coherent detection result with an excellent communication quality.

Thus, according to this embodiment, the coherent detection is performed with all the phase correcting values corresponding to all the phase rotation amounts predetermined in the closed-loop transmission diversity, and one with an excellent communication quality is adopted as the coherent detection result, whereby it is not necessary for a communication terminal apparatus to store the feedback information. Since the need for storing information is thereby eliminated in the closed-loop transmission diversity, it is possible to use a memory in a communication terminal apparatus effectively.

The present invention is not limited to the above-mentioned first to third embodiments, and is capable of being carried into practice with various modifications thereof. For example, in the above-mentioned first to third embodiments is explained the case that the closed-loop transmission diversity is of mode 2. However, the present invention is capable of being applied to closed-loop transmission diversity of another mode. In the above-mentioned second and third embodiments is explained the case that SIR is used as a criterion for evaluating a communication quality to judge whether phase correction is needed. However, the present invention is capable of being applied to another case that as a criterion for evaluating a communication quality, another criterion other than SIR, such as likelihood, is used.

A communication terminal apparatus of the present invention has a configuration provided with a feedback information calculating section that calculates feedback information using respective first channel estimation values obtained from respective common known signals transmitted respectively from different antennas of a base station apparatus in closed-loop transmission diversity, a phase correcting amount calculating section that calculates a phase correcting amount for correcting phase rotation with which the base station apparatus provides a communication channel signal in the transmission diversity, based on the feedback information, and a coherent detection section that performs coherent detection on the communication channel signal using a second channel estimation value obtained by subjecting a channel estimation value obtained from the communication channel signal to phase correction using the phase correcting amount.

A communication terminal apparatus of the present invention has a configuration provided with a feedback information calculating section that calculates feedback information using respective first channel estimation values obtained from respective common known signals transmitted respectively from different antennas of a base station apparatus in closed-loop transmission diversity, a phase correcting amount calculating section that calculates a phase correcting amount for correcting phase rotation with which the base station apparatus provides a communication channel signal in the transmission diversity, based on the feedback information, a channel estimating section that performs channel estimation using the communication channel signal subjected to phase correction using the phase correcting amount, and a coherent detection section that performs coherent detection on the communication channel signal using a second channel estimation value obtained by the channel estimation.

According to these configurations, in the closed-loop transmission diversity, the communication terminal apparatus calculates the correcting value for compensating for an effect of the phase rotation due to the transmission diversity using the known feedback information, corrects a received signal on the communication channel based on the correcting value, and thereby is capable of performing accurate channel estimation and of exhibiting excellent reception performance.

The communication terminal apparatus of the present invention has the above-described configuration further provided with a weighting averaging section that performs weighting on second channel estimation values over a plurality of slots to average, and performs the coherent detection on an average of weighted channel estimation values.

According to this configuration, it is possible to improve channel estimation accuracy on the communication channel. It is thereby possible to perform accurate channel estimation even when the closed-loop transmission diversity is applied.

A communication terminal apparatus of the present invention has a configuration provided with a feedback information calculating section that calculates feedback information using respective channel estimation values obtained from respective common known signals transmitted respectively from different antennas of a base station apparatus in closed-loop transmission diversity, a phase correcting amount calculating section that calculates a phase correcting amount for correcting phase rotation with which the base station apparatus provides a communication channel signal in the transmission diversity, based on the feedback information, a communication quality measuring section that measures communication qualities of the communication channel signal subjected to coherent detection and of the communication channel signal subjected to phase correction using the phase correcting amount and to coherent detection, and a selecting section that selects one with an excellent measured communication quality from the communication channel signals.

According to this configuration, the communication terminal apparatus performs coherent detection on both communication channel signals which are subjected and not subjected to phase correction, uses one with an excellent communication quality as a coherent detection result, and therefore is, even when incorrect feedback information arrives at a base station apparatus, capable of performing accurate channel estimation and of exhibiting excellent reception performance. The communication terminal apparatus is thereby capable of exhibiting excellent reception performance with higher accuracy in the closed-loop transmission diversity.

A communication terminal apparatus of the present invention has a configuration provided with a phase correcting amount calculating section that calculates a plurality of phase correcting amounts each for correcting phase rotation with which a base station apparatus provides a communication channel signal in closed-loop transmission diversity, based on the phase rotation amounts in the closed-loop transmission diversity, a communication quality measuring section that measures communication qualities of communication channel signals obtained by subjecting the communication channel signal transmitted from the base station apparatus to phase correction using the plurality of phase correcting amounts and to coherent detection, and a selecting section that selects one with an excellent measured communication quality from the communication channel signals.

According to this configuration, the coherent detection is performed with all the phase correcting values corresponding to all the phase rotation amounts predetermined in the closed-loop transmission diversity, and one with an excellent communication quality is adopted as the coherent detection result, whereby it is not necessary for a communication terminal apparatus to store the feedback information. Since the need for storing information is thus eliminated in the closed-loop transmission diversity, it is possible to use a memory in a communication terminal apparatus effectively.

A communication terminal apparatus of the present invention has a configuration provided with a phase predict value calculating section that obtains a respective phase predict value in receiving a communication channel signal provided with each phase rotation, for each phase rotation amount defined in closed-loop transmission diversity, a channel estimating section that obtains a channel estimation value from a received communication channel signal, and a phase correcting amount calculating section which obtains a respective angle difference between a phase of the channel estimation value and each phase predict value, and based on the phase predict value corresponding to the angle difference with highest likelihood among the angle differences, which calculates a phase correcting amount.

According to this configuration, the need for communicating the feedback information with a base station apparatus is eliminated, whereby it is possible to simplify the communication control and also to improve the transmission efficiency.

The communication terminal apparatus of the present invention performs, in the above-mentioned configuration, weighting on likelihood corresponding to feedback information to be transmitted to a base station apparatus. According to this configuration, the communication terminal apparatus is capable of identifying the phase rotation amount provided by the base station apparatus with high accuracy.

A base station apparatus of the present invention has a feature of performing radio communications with the communication terminal apparatus with the above-mentioned configuration. It is thereby possible to perform the radio communications while maintaining excellent reception performance even in the closed-loop transmission diversity.

In a radio communication method of the present invention, in closed-loop transmission diversity, a communication terminal apparatus calculates feedback information using respective channel estimation values obtained from respective common known signals transmitted respectively from different antennas of a base station apparatus, and transmits the feedback information to the base station apparatus, the base station apparatus transmits a communication channel signal provided with phase rotation based on the feedback information to the communication terminal apparatus, and the communication terminal apparatus calculates a phase correcting amount for correcting the phase rotation based on the feedback information, and performs coherent detection on the communication channel signal using a channel estimation value subjected to phase correction using the phase correcting amount.

In a radio communication method of the present invention, in closed-loop transmission diversity, a communication terminal apparatus calculates feedback information using respective channel estimation values obtained from respective common known signals transmitted respectively from different antennas of a base station apparatus, and transmits the feedback information to the base station apparatus, the base station apparatus transmits a communication channel signal provided with phase rotation based on the feedback information to the communication terminal apparatus, and the communication terminal apparatus calculates a phase correcting amount for correcting the phase rotation based on the feedback information, performs channel estimation using the communication channel signal subjected to phase correction using the phase correcting amount and performs coherent detection on the communication channel signal using a channel estimation value obtained by the channel estimation.

According to these methods, in the closed-loop transmission diversity, the communication terminal apparatus calculates the correcting value for compensating for an effect of the phase rotation due to the transmission diversity using the known feedback information, corrects a received signal on the communication channel based on the correcting value, and thereby is capable of performing accurate channel estimation and of exhibiting excellent reception performance.

In a radio communication method of the present invention, in closed-loop transmission diversity, a communication terminal apparatus calculates feedback information using respective channel estimation values obtained from respective common known signals transmitted respectively from different antennas of a base station apparatus, and transmits the feedback information to the base station apparatus, the base station apparatus transmits a communication channel signal provided with phase rotation based on the feedback information to the communication terminal apparatus, and the communication terminal apparatus calculates a phase correcting amount for correcting the phase rotation based on the feedback information, measures communication qualities of the communication channel signal subjected to coherent detection and of the communication channel signal subjected to phase correction using the phase correcting amount and to coherent detection, and selects one with an excellent measured communication quality from the communication channel signals.

According to this method, coherent detection is performed on both communication channel signals which are subjected and not subjected to phase correction, and one with an excellent communication quality is used as a coherent detection result, whereby even when incorrect feedback information arrives at a base station apparatus, it is possible to perform accurate channel estimation and to exhibit excellent reception performance. The present invention thereby enables excellent reception performance with higher accuracy in the closed-loop transmission diversity.

In a radio communication method of the present invention, in closed-loop transmission diversity, a communication terminal apparatus calculates feedback information using respective channel estimation values obtained from respective common known signals transmitted respectively from different antennas of a base station apparatus, and transmits the feedback information to the base station apparatus, the base station apparatus transmits a communication channel signal provided with phase rotation based on the feedback information to the communication terminal apparatus, and the communication terminal apparatus calculates a plurality of phase correcting amounts each for correcting the phase rotation based on the feedback information, measures communication qualities of communication channel signals obtained by subjecting the communication channel signal transmitted from the base station apparatus to phase correction using the plurality of phase correcting amounts and to coherent detection, and selects one with an excellent measured communication quality from the communication channel signals.

According to this method, the coherent detection is performed with all the phase correcting values corresponding to all the phase rotation amounts predetermined in the closed-loop transmission diversity, and one with an excellent communication quality is adopted as the coherent detection result, whereby it is not necessary for a communication terminal apparatus to store the feedback information. Since the need for storing information is thus eliminated in the closed-loop transmission diversity, it is possible to use a memory in the communication terminal apparatus effectively.

According to the present invention as described above, in the closed-loop transmission diversity, a communication terminal apparatus calculates the correcting value for compensating for an effect of the phase rotation due to the transmission diversity using the known feedback information, corrects a received signal on the communication channel based on the correcting value, and thereby is capable of performing accurate channel estimation and of exhibiting excellent reception performance.

This application is based on the Japanese Patent Application No. HEI11-346468 filed on Dec. 6, 1999, entire content of which is expressly incorporated by reference herein.

INDUSTRIAL APPLICABILITY

The present invention is applicable to a digital radio communication system, and more particularly to a communication terminal apparatus and radio communication method in a DS-CDMA system.

What is claimed is:

1. A communication terminal apparatus comprising:
a first channel estimator that calculates first channel estimation values, corresponding respectively to a plurality of antennas in a base station apparatus, using a plurality of common known signals that are transmitted from the plurality of antennas, respectively;
a phase correction amount calculator that calculates phase correction amounts, based on the first channel estimation values, for use in correction of phase rotations applied to communication channel signals that are transmitted from the plurality of antennas, respectively;
a receiver that receives the communication channel signals, to which the phase rotations are applied at the plurality of antennas respectively and transmitted;
a phase corrector that phase corrects the received communication channel signals or second channel estimation values, which are calculated from the received communication channel signals, according to the phase correction amounts;
a coherent detector that performs coherent detection on a communication channel signal that is subjected to the phase correction by the phase corrector and a communication channel signal that is not subjected to the phase correction by the phase corrector;
a communication quality measurer that measures communication quality of a coherent detection result of the communication channel signal that is subjected to the phase correction and communication quality of a coherent detection result of the communication channel signal that is not subjected to the phase correction; and
a selector that selects the communication channel signal that presents higher communication quality according to the coherent detection results.

2. A communication terminal apparatus comprising:
a first channel estimator that calculates first channel estimation values, corresponding respectively to a plurality of antennas in a base station apparatus, using a plurality of common known signals that are transmitted from the plurality of antennas, respectively;
a phase correction amount calculator that calculates phase correction amounts, based on the first channel estimation values, for use in correction of phase rotations applied to communication channel signals that are transmitted from the plurality of antennas, respectively;
a receiver that receives the communication channel signals, to which the phase rotations are applied at the plurality of antennas respectively and transmitted;
a phase corrector that phase corrects the received communication channel signals or second channel estimation values, which are calculated from the received communication channel signals, according to the phase correction amounts;
a coherent detector that performs coherent detection on communication channel signals subjected to phase correction by the phase corrector;
a communication quality measurer that measures communication qualities of coherent detection results of the communication channel signals; and
a selector that selects a coherent detection result that presents high communication quality, wherein:
the phase correction amount calculator calculates a plurality of phase correction amounts corresponding respectively to all phase rotations applied to the plurality of antennas;
the phase corrector performs the phase correction of the communication channel signals applying the plurality of phase correction amounts respectively; and
the coherent detector performs coherent detection on the communication channel signals corresponding respectively to the plurality of phase correction amounts.

3. A communication terminal apparatus comprising:
a first channel estimator that calculates first channel estimation values, corresponding respectively to a plurality of antennas in a base station apparatus, using a plurality of common known signals that are transmitted from the plurality of antennas, respectively;
a phase correction amount calculator that calculates phase correction amounts, based on the first channel estimation values, for use in correction of phase rotations applied to communication channel signals that are transmitted from the plurality of antennas, respectively;
a receiver that receives the communication channel signals, to which the phase rotations are applied at the plurality of antennas respectively and transmitted;
a phase corrector that phase corrects the received communication channel signals or second channel estimation values, which are calculated from the received communication channel signals, according to the phase correction amounts;
a phase prediction value calculator that calculates phase prediction values corresponding respectively to all phase rotations that are applicable to the plurality of antennas; and
a second channel, estimator that estimates second channel estimation values from the communication channel signals to which the phase rotations are applied, at the plurality of antennas, wherein:

the phase correction amount calculator finds an angle difference between the phase of each second channel estimation value and each phase prediction value, and calculates the phase correction amounts based on the phase prediction value corresponding to the found angle difference whose angle difference is more likely to occur than the other found angle differences.

4. The communication terminal apparatus of claim 3, further comprising:

a transmitter that transmits the feedback information, representing the phase rotation amounts to be applied to the communication channel signals at the plurality of antennas, wherein:

the phase correction amount calculator weights the likelihood according to the feedback information transmitted.

5. A radio communication method comprising:

(a) calculating first channel estimation values, corresponding respectively to a plurality of antennas in a base station apparatus, using a plurality of common known signals that are transmitted from the plurality of antennas, respectively;

(b) calculating phase correction amounts, based on the first channel estimation values, for use in correction of phase rotations applied to communication channel signals that are transmitted from the plurality of antennas, respectively;

(c) receiving the communication channel signals, to which the phase rotations are applied at the plurality of antennas respectively and transmitted;

(d) phase correcting the received communication channel signals or second channel estimation values, which are calculated from the received communication channel signals, according to the phase correction amounts;

(e) performing coherent detection on communication channel signals subjected to phase correction in step (d);

(f) measuring communication qualities of coherent detection results of the communication channel signals; and (g) selecting a coherent detection result that presents high communication quality, wherein:

the plurality of phase correction amounts calculated in step (b) correspond respectively to all phase rotations applied to the plurality of antennas, the phase correction of the received communication channel signals in step (d) is performed by applying the plurality of phase correction amounts respectively, and the communication channel signals that are coherently detected in step (e) correspond respectively to the plurality of phase correction amounts.

6. A radio communication method comprising:

(a) calculating first channel estimation values, corresponding respectively to a plurality of antennas in a base station apparatus, using a plurality of common known signals that are transmitted from the plurality of antennas, respectively;

(b) calculating phase correction amounts, based on the first channel estimation values, for use in correction of phase rotations applied to communication channel signals that are transmitted from the plurality of antennas, respectively;

(c) receiving the communication channel signals, to which the phase rotations are applied at the plurality of antennas respectively and transmitted;

(d) phase correcting the received communication channel signals or second channel estimation values, which are calculated from the received communication channel signals, according to the phase correction amounts;

(e) performing coherent detection on communication channel signals subjected to phase correction by the phase corrector;

(f) measuring communication qualities of coherent detection results of the communication channel signals; and (g) selecting a coherent detection result that presents high communication quality, wherein:

the plurality of phase correction amounts calculated in step (b) correspond respectively to all phase rotations applied to the plurality of antennas, the phase correction of the received communication channel signals in step (d) is performed by applying the plurality of phase correction amounts respectively, and the communication channel signals that are coherently detected in step (e) correspond respectively to the plurality of phase correction amounts.

7. A radio communication method comprising:

(a) calculating first channel estimation values, corresponding respectively to a plurality of antennas in a base station apparatus, using a plurality of common known signals that are transmitted from the plurality of antennas, respectively;

(b) calculating phase correction amounts, based on the first channel estimation values, for use in correction of phase rotations applied to communication channel signals that are transmitted from the plurality of antennas, respectively;

(c) receiving the communication channel signals, to which the phase rotations are applied at the plurality of antennas respectively and transmitted;

(d) phase correcting the received communication channel signals or second channel estimation values, which are calculated from the received communication channel signals, according to the phase correction amounts;

(e) calculating phase prediction values corresponding respectively to all phase rotations that are applicable to the plurality of antennas; and (f) estimating second channel estimation values from the communication channel signals to which the phase rotations are applied, at the plurality of antennas, wherein:

step (b) further comprises finding an angle difference between the phase of each second channel estimation value and each phase prediction value, and calculating the phase-correction amounts based on the phase prediction value corresponding to the found angle difference whose angle difference is more likely to occur than the other found angle differences.

* * * * *